United States Patent [19]

Baker

[11] Patent Number: 4,647,056
[45] Date of Patent: Mar. 3, 1987

[54] PORTABLE LUGGAGE CARRIER

[76] Inventor: Franklin W. Baker, 6265 S. LaBrea Ave., Los Angeles, Calif. 90056

[21] Appl. No.: 714,886
[22] PCT Filed: Jul. 12, 1983
[86] PCT No.: PCT/US83/01054
§ 371 Date: Mar. 15, 1985
§ 102(e) Date: Mar. 15, 1985
[87] PCT Pub. No.: WO85/00329
PCT Pub. Date: Jan. 31, 1985
[51] Int. Cl.$^4$ .............................................. A45C 5/14
[52] U.S. Cl. ................................. 280/37; 190/18 A
[58] Field of Search ...................... 280/8, 9, 10, 11, 35, 280/37, 38, 39, 43.1, 43.24, 639, 79.1 R; 190/18 A, 18 R

[56] References Cited

U.S. PATENT DOCUMENTS

| | | | |
|---|---|---|---|
| 2,471,553 | 5/1949 | Zuckerman | 280/37 |
| 2,484,951 | 10/1949 | Kubo | 280/9 |
| 3,488,062 | 1/1970 | Walda | 280/79.1 R |
| 3,963,256 | 6/1976 | Stafford | 280/35 |
| 4,273,222 | 6/1981 | Cassimally et al. | 280/37 |

Primary Examiner—John J. Love
Assistant Examiner—Richard Camby
Attorney, Agent, or Firm—Albert O. Cota

[57] ABSTRACT

A Portable Luggage Carrier (10) having a resilient mounting surface (24) to accept hand luggage, with castors (48) and (50) providing mobility and weight receiving characteristics. A structural frame (20) provides a rigid mounting surface and attachment for the castors (48) and (50) that are retractable into the frame body (20). A flexible towing strap (52) with a slideable buckle (54) is interposed with the frame (20) and encompasses luggage that is juxtaposed on the mounting surface. The strap (52) is tightened with the buckle (54) and the remaining end becomes a hand held towing strap. A securing latch (36) is spring loaded into the retractable member (25) or (26) to lock the castors into either the extended or retracted position. The preferred embodiment includes a removable cover (61) that slips over the carrier exposing the handle thorugh a slot in the cover. In another embodiment the carrier comprises a combination brief case and cover (73). In still another embodiment a hinged back cover (62) encloses the carrier (70). This cover is locked in place and may incorporate a flashing light (66) and a clock (68).

6 Claims, 28 Drawing Figures

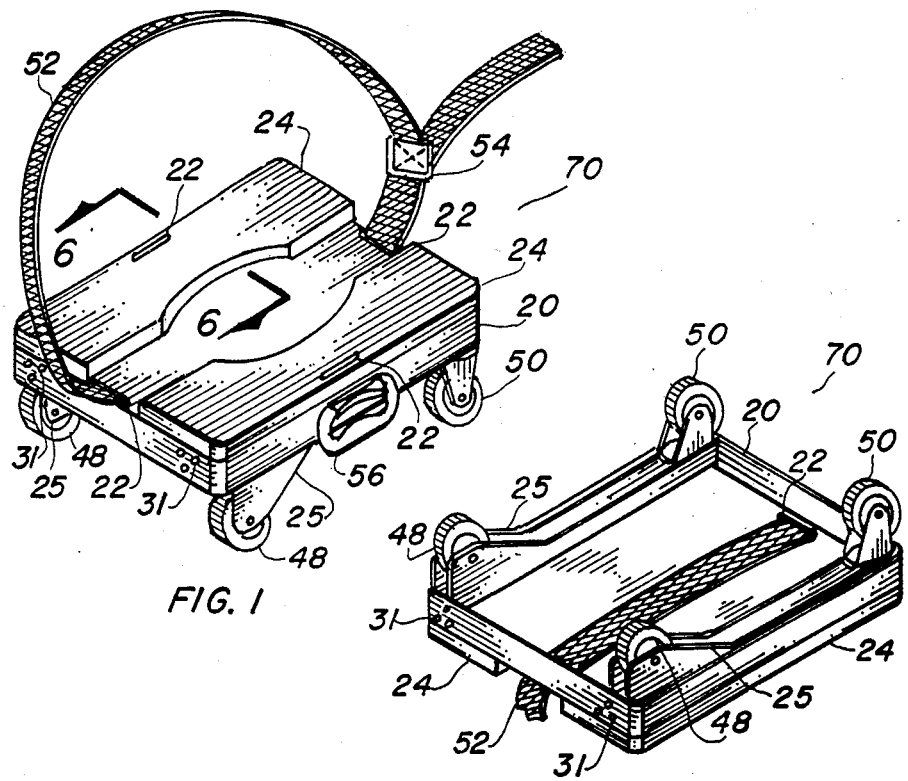
FIG. 1
FIG. 2
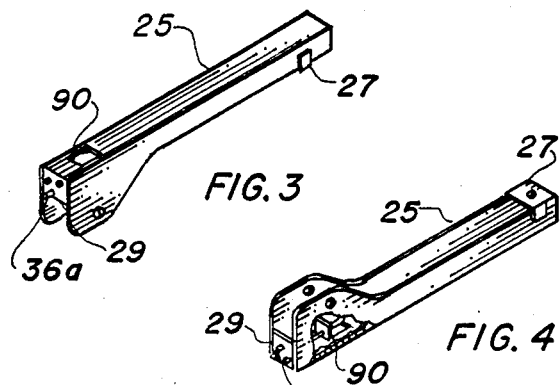
FIG. 3
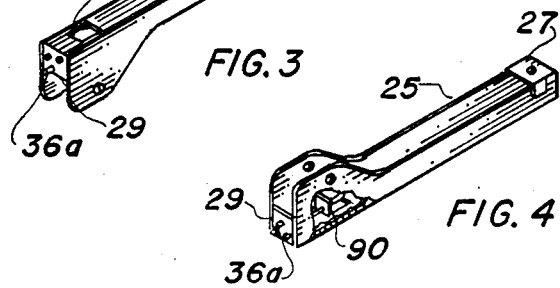
FIG. 4
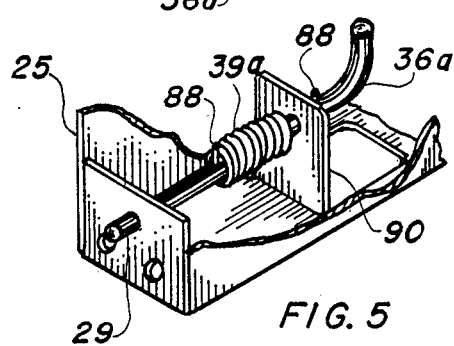
FIG. 5
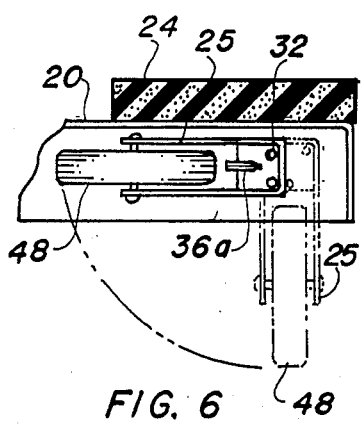
FIG. 6

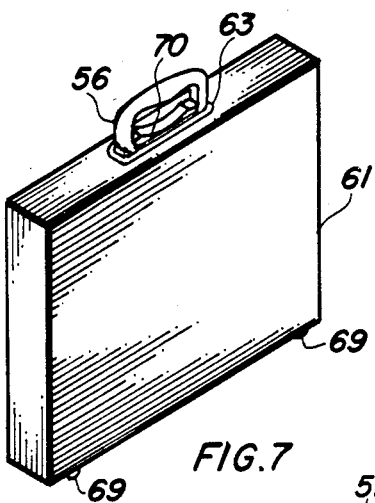
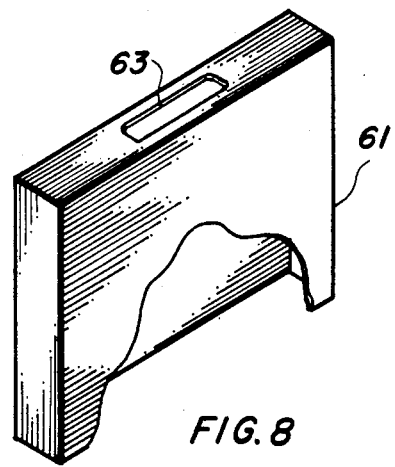
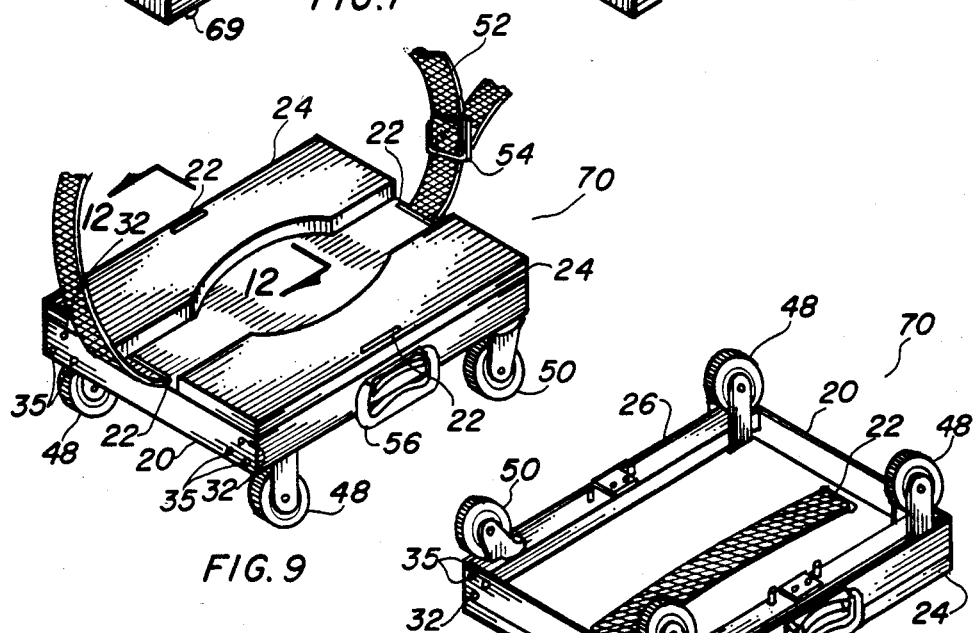
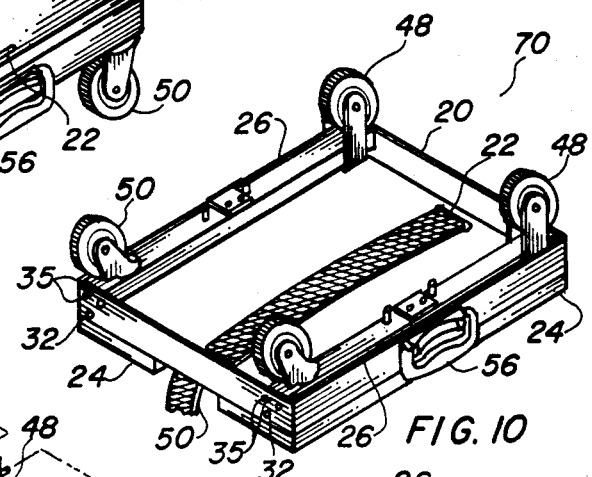
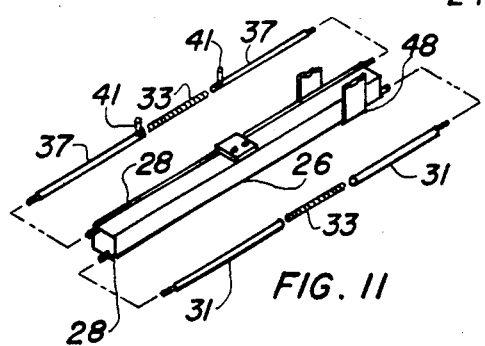
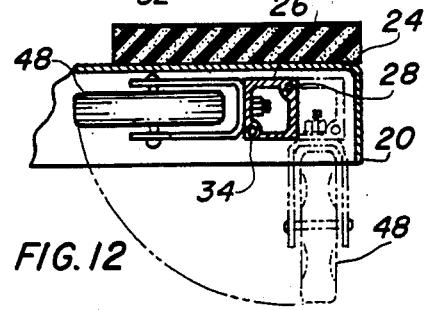

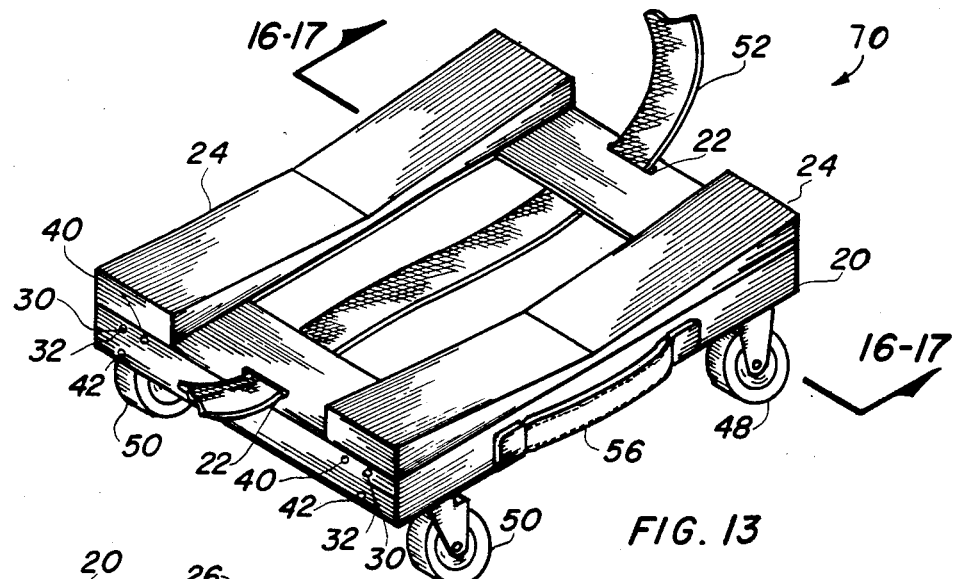
FIG. 13
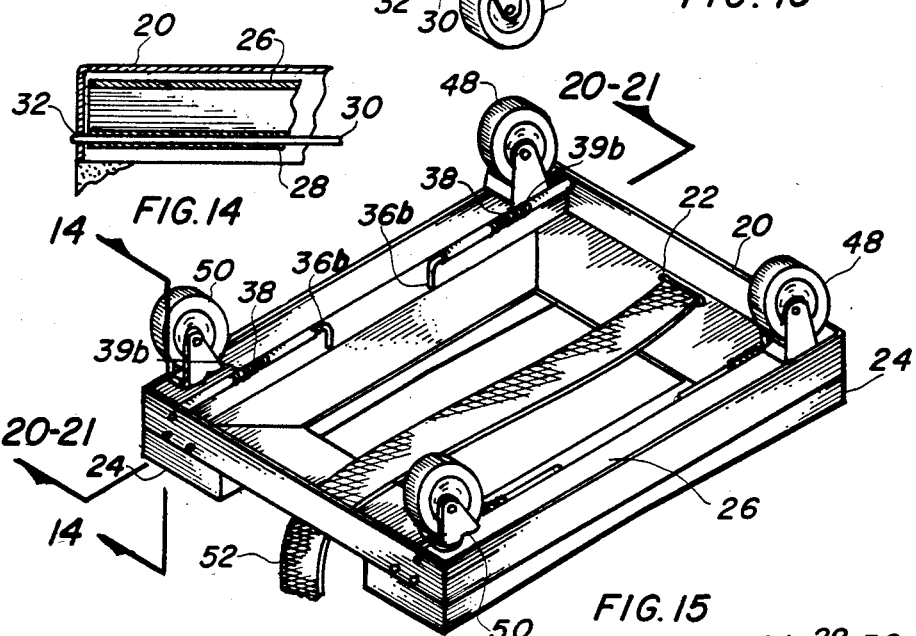
FIG. 14
FIG. 15
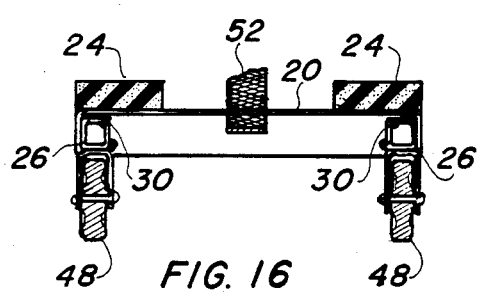
FIG. 16
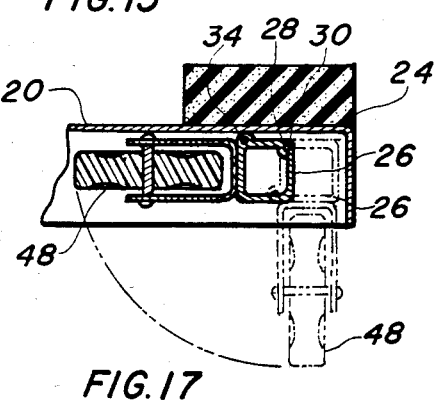
FIG. 17

PORTABLE LUGGAGE CARRIER

TECHNICAL FIELD

This invention pertains in general to dollies and wheeled carts and, more particularly, to luggage carriers that are portable and diminishable in size.

BACKGROUND ART

Previously, carrying devices for personal luggage have been limited to wheeled trucks, usually constructed of tubular material with a toeplate extending near the bottom for stacking the luggage. Many varieties and styles of trucks have been used, such as a continuous handle type, bicycle handle, pistol grip handle, single and double loop style, and also "S", pin or tee-type handles. All of these varieties use the same principle of stacking with gravity holding the containers against the frame when angled backward toward the operator. The two wheels provide the mobility and steerage is accomplished manually.

For larger quantities of luggage, four-wheeled platform trucks are used with two steerable wheels and a raised superstructure. Other trucks, such as a wagon type using steerable wheels attached to a towing arm or tongue, have also been in use. Dollies using four castors, either two swivel and two.rigid, or all four swivel are common for moving articles and are constructed with rigid decking, such as wood or tubular structure.

A search of the prior art did not disclose any patent that read on the claims of the instant invention. However, the following U.S. patents are considered related:

| U.S. Pat. No. | INVENTOR | ISSUED |
| --- | --- | --- |
| 4,274,644 | Taylor | 23 June 1981 |
| 2,849,241 | Owen | 26 August 1958 |
| 2,661,220 | Davis | 1 December 1953 |

The Taylor patent discloses a four-wheeled hand truck that is comprised of a platform; a pair of wheel-connecting bars rotatably attaching to the platform; a plurality of wheels being rotatable; and a handle pivotally connecting at two points on an end of the platform. A handle release and locking means attaches to the platform and locks the handle member either in an open or in a closed position. The wheels fold up underneath the platform when the handle member is in the closed position.

The Owen patent describes a device for carrying a kitchen stove or the like. The invention comprises two body parts of the same width but of longer and shorter extent. The two parts are hinged together in such manner that they may first occupy extended position upon the floor so as to permit the stove or the like to be placed in upright position upon the longer body part, whereupon the other body part may be swung up to upright position and the stove may then be strapped in.

The Davis patent discloses a wheel assembly for carrying suitcases or the like. The invention comprises a platform having a set of wheels provided on brackets which can be folded with the wheels against a surface of the suit-case so that they will project a minimum distance from the suit-case consistent with being wholly outside of the normal contour of the suit-case. The folding brackets are detachably mounted on plates which are easily and permanently secured to the outside of the case.

DISCLOSURE OF INVENTION

Luggage is commonly moved by the aforementioned two-wheeled carts, some are even collapsible and are carried with the passenger. More recently, castors have been provided integral with the luggage for this purpose. In many cases, more than one piece of luggage is necessary for travel, therefore, there has existed a requirement for an alternate method. Further, the means to provide this utility also includes carrying the device along with the luggage for loading and unloading.

The Portable Luggage Carrier fills this need, therefore, the primary object is to provide a lightweight, portable device that collapses flat into a relatively small package, with a carrying handle that may be easily transported along with the luggage and be available for use at any time during a trip.

An important object provides the ease of handling a number of pieces of luggage stacked one on top of the other at a low level to the floor, minimizing lifting and maximizing the load carrying capabilities of one person.

Another object allows the luggage to be stacked safely, as a strap easily encircles the superposed pieces and the invention includes a non-slip resilient pad to eliminate slipping of the first article. Further, as the bags are stacked flat, no balance is required such as necessary in a two-wheeled truck where a certain amount of strength is required to maintain this delicate balance while manipulating a load through a crowd of passengers.

Still another object provides ease of maneuverability, as the end of the strap is used for towing the luggage which is easily moved along with the operator through crowds, as the carrier follows closely the path already made. It is also possible to push the carrier forward in circumstances requiring close quarters, such as queues or congested areas, as sometimes encountered in travel terminals.

Yet another object provides an accessory that enhances the asthetic value by incorporating a removable one piece cover. When the cover is in place, the handle is exposed through an opening on the top of the cover. An additional accessory consists of a removable snap-in-place cover of material that encloses the exposed back when the castors are retracted for transportation.

Yet another object takes advantage of a briefcase type bag with one or more compartments on either side of the carrier allowing complete utility of a briefcase as well as a practical cover for the carrier.

A further object incorporates another embodiment that utilizes a back cover with a flashing light and clock on the top surface to completely close the back. When opened 270 degrees it becomes a vertical structural member to stabilize the luggage stacked on the carrier and allows a mounting surface for the flashing safety light. The clock adds convenience for the traveler and the cover is locked in place with a combination lock.

These and other objects and advantages of the present invention will become apparent from the subsequent detailed description of the preferred embodiment and the claims taken in conjunction with the accompanying drawings.

BRIEF DESCRIPTION OF THE DRAWINGS

FIG. 1 is a partial isometric view of the preferred embodiment with the castors extended and the end of the flexible towing strap partially cut away for clarity.

FIG. 2 is a partial isometric view of the bottom of the preferred embodiment with castors extended.

FIG. 3 is a partial isometric view of one of the castor attaching carriages removed completely from the preferred embodiment depicted in the normal operating position with the castors removed.

FIG. 4 is the same element as in FIG. 3 shown reversed 180 degrees.

FIG. 5 is a partial detail of the latch holding the castor attaching carriage completely removed from the preferred embodiment and cut away.

FIG. 6 is a cross sectional view taken along lines 6—6 of FIG. 1 enlarged in scale to clearly indicate the rotational position of the castor as shown in phantom.

FIG. 7 is a partial isometric view of the preferred embodiment with the removable protective cover in place ready for carrying.

FIG. 8 is a partial isometric view of the protective cover removed and cut away for clarity.

FIG. 9 is a partial isometric view of another embodiment depicted in the functional position with the wheels extended and the flexible towing strap partially cut away.

FIG. 10 is a partial view of the underside of the same embodiment with the wheels extended.

FIG. 11 is a partial isometric view of one of the square structural tubes separated from the carrier and the pivot and locking pins with corresponding springs exploded from the tube.

FIG. 12 is a partial cross sectional view taken, along lines 12—12 of FIG. 9 depicting the castor in its retracted position and extended in phantom.

FIG. 13 is a partial isometric view of yet another embodiment with the flexible towing strap partially cut-away.

FIG. 14 is a cross-sectional view taken along lines 14—14 of FIG. 15.

FIG. 15 is a partial isometric view of the bottom of the embodiment.

FIG. 16 is a cross-sectional view taken along lines 16—16 of FIG. 13.

FIG. 17 is a partial corss-sectional view taken along lines 17—17 of FIG. 13.

BEST MODE FOR CARRYING OUT THE INVENTION

Figure 18:
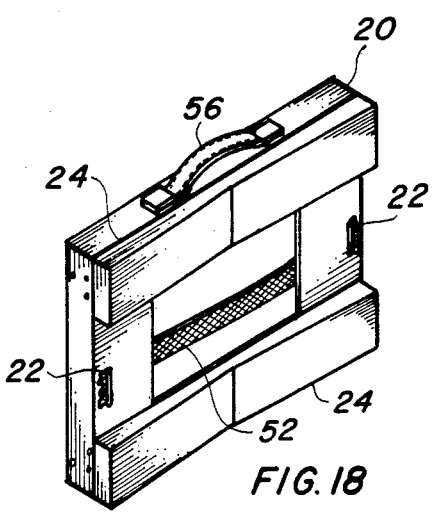
FIG. 18 is a partial isometric view of yet another embodiment with the castors retracted in the carrying position.

Referring now in detail to the drawings and describing the preferred embodiment FIGS. 1 thru 6 depict the carrier 70 in an extended working position with a frame 20 consisting of a structural member in rectangular shape, preferably made as a deep drawn box of one piece construction with a flat body surface and flanges drawn on all four sides evenly forming a unitary frame. In another embodiment depicted in FIGS. 9, 10 and 12, the body is an integral member with the corners notched in the flat and flanges broken at ninety degrees to the major surface forming a rectangular box like structure. In yet another embodiment, best illustrated in FIGS. 13 thru 17, the frame 20 is in angular shape, mitered on each end, and attached together by welding or the like. The material of the frame 20 may be any substance having characteristics of structural integrity sufficient to support weight, with aluminum being preferred. The frame has a flat surface on the top or outside and also the bottom or inside. At right angles to the flat surface is an outer flange surrounding the periphery of the structure. Slotted openings 22 are centrally located in the flat surface near the outer edge with either one or two pairs opposed from each other.

On the outside top surface are mounted one or more resilient pads 24 extending to the outer edge of the frame 20. These pads 24 are shaped in some type of concave shape to conform to the irregular size and configuration of the luggage. The pads 24 create a non-slip surface and are securely bonded to the frame with adhesive or the like. They are made of a closed cellular sponge of polyvinyl, urethane, or the like, with neoprene being preferred.

In the preferred embodiment illustrated in FIGS. 1 through 6 the mobility for the carrier is supplied by four castors 48 and 50 mounted in pairs to a matching set of castor attaching carriages 25. These carriages are of one piece construction in basic channel shape with the web planar to the frame 20 and the legs extended downward. On one end the legs are extended to receive the fixed castors 48 mounted therethrough and on the other a flange 27 is formed boxing in the end creating a mounting surface for a swivel castor 50. Tabs are bent on this flange 27 overlaping the legs to add structural support and rigidity. The end having the fixed castors further containing an end flange 29 having a series of holes for rotationally mounting and locking in place. One hole provides for pivoted rotation when used in conjunction with a solid rivet 31 mounted therein allowing the entire carriage 25 to rotate within the confines of the frame 20 retracting flat into the inside of the structure. The locking arrangement utilizes an angular latch 36a being in a round rod shape with an angle bent on one end. A latch attaching flange 90 is formed from the parent material of the carriage 25 being broken at a 90 degree angle from the web. The latch 36a is positioned within aligned holes in both the end flange 29 and latch flange 90 with a compression spring 39a located slideably therebetween. A pair of pins 88 penetrating the latch 36a retain the spring 39a between the flanges 29 and 90 also on the outboard side of the latch flange 90 urgingly holding the latch 36a in the extended position. In operation, the carriages 25 are rotated outward into the extended position allowing the castors 48 and 50 to be utilized for mobility of the carrier. For transportation the latches 36a are slid away from the frame retracting the ends from mating holes in the frame allowing the carriages 25 to be rotated 90 degrees retracting completely flat within the confines of the frame 20 and locking in the remaining holes 32.

In another embodiment shown in FIGS. 9 through 12 nested inside the frame 20 adjacent to the flanges are a pair of retractable members 26 that provide a structural mounting surface and pivotally rotate within the frame for retraction purposes. These members 26 are square structural tubes with one or more bosses at opposed internal corners having a bore 28 with an external groove extending through to an opposite outside surface running the full length within the boss, best illustrated in FIGS. 11, 12, 14 and 17. Within this bore 28 is a hinge pin 30 that also runs the full length of the member 26 parallel to the longitudinal axis, or is in two separate pieces 31 with a compression spring 33 in between, in either case it protrudes slightly beyond the end and having stepped ends forming a shoulder creates an axial pivot arm interfacing with holes 32 in the frame 20 becoming the pivot point for the rotatable member 26. This relationship is best depicted in FIGS. 12 and 17. The member 26 has another boss similar to the first except on an adjacent corner, and may be external to the square shape or is preferrably a mirror image. A bore 34 is centrally located within the boss, shown in FIGS. 12 and 17, and contains a pair of external end stepped locking pins 37 slideably contained within the tube bore 34. These locking pins 37 have a stepped shoulder of a smaller diameter on one end and further contain a projecting lug 41 attached through the pin at right angles to the longitudinal surface near the end opposite the step. Another compression spring 33 is positioned within the bore 34 between the pair of pins 37 urgingly forcing the stepped ends outward where they interface with one of the set of holes 35 in the frame 20. This pair of holes 35 align with the locking pins 37 when the member 26 is rotated into either the collapsed or extended position thus providing a positive locked condition. The lugs 41 are disposed in close proximity allowing the operation to squeeze them together with one hand while making the transition from one position to the other. The lugs 41 are retained by the external groove in the bore with a portion of the lug 41 protruding beyond this groove to assure alignment with its mate.

Figure 20:
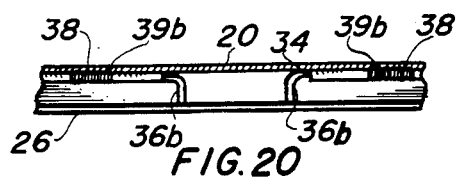
FIG. 20 is a cross-sectional view of the securing latch taken along lines 20—20 of FIG. 15.

In yet another embodiment illustrated in FIGS. 14 and 15 this locking mechanism consists of a pair of securing latches 36b that are in an "L" shape and protrude from either end of the member 26. The external boss of the member 26 is cut-away in the center to accept the leg of the latch 36b allowing it to freely rotate and move linearly within the bore 34. Rotation may be limited, if desired, to preclude the possibility of the latch hanging below the envelope of the frame 20. In still another embodiment a second opening 38 shown in FIGS. 15 and 20 is included on each end and is centrally located allowing the securing latch spring 39b to surround the latch 36b and provide compression maintaining the extension beyond the end of the member 26. This latch 36b urgingly embraces the frame and penetrates a hole 40 shown in FIG. 12, near the top, or another hole 42 near the bottom of the frame to maintain the member 26 in either the extended or retracted position.

Figure 21:
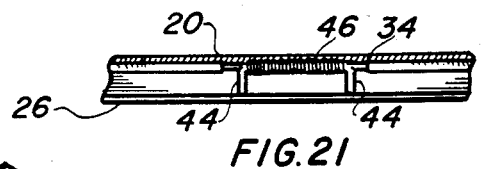
FIG. 21 is a cross-sectional view of another embodiment of the securing latch taken along lines 21—21 of FIG. 15.

In another embodiment, shown in FIG. 21, a pair of securing latches 44 are in a "tee" shape and utilize only one compression spring 46 mounted on the latches 44 extending therebetween. The operation is the same as in the above embodiment.

Attached to each member 26 is a rigid base castor 48 and swivel base castor 50. These castors provide the mobility for the apparatus, and as two are swiveling and the other two are fixed, the assembly tracks straight when moved in either longitudinal direction. The castor wheels may be hard rubber, urethane, or a type of thermoplastic, each working equally well, or any other substance suitable for the application. The members 26 are stored in the retracted position with the castors 48 and 50 contiguous with the inside surface of the base 20. When prepared for use the latches 36, 37 or 44 are slid together releasing them from the frame and the member is rotated ninety degrees exposing the castors and the latches lock into place in the holes 35 or 40 in the frame 20.

A flexible towing strap 52 is threaded through the slotted openings 22 in the frame and encompasses the luggage that is placed on the device. On one end a slideable buckle 54 is attached providing tension to secure the luggage and when desired, the end of the buckle 54 is pulled toward the strap, loosening the tension allowing the luggage to be removed. The other end of the strap 52 is free to be grasped by ones hand and used as a towing strap.

A collapsible or retractable handle 56, shown in FIGS. 1, 7, 9, 10, 13, 18, 19 and 22, is attached to the frame 20 at the longitudinal leg. This handle 56 is used for carrying and is collapsed flat or is retracted into itself at the fitting ends when not in use.

The preferred embodiment utilizes a removable protective cover 61 shown in FIGS. 7 and 8, that consists of a hollow rectangular shaped box with one end open. The inside envelope of the cover 61 is compatible with the outside shape of the carrier 70 allowing it to be receivably accepted forming a loose fitting protective enclosure. In the top of the cover opposite the open end is a slot 63 in alignment with the handle 56 allowing penetration of the handle when slipped over the carrier for manually holding the device when transporting and not in use as a luggage carrier. This cover 61 may be any material suitable for the purpose such as aluminum, steel, composition wood, or thermoplastic with Dupont's registered trademark ZYTEL ST being preferred. This material must be rigid and maintain its integrity however, may be relatively thin in nature as the structure is incorporated in the carrier itself with its own integral handle 56. Four rubber bumpers 69 are attached to the carrier frame 20 on the side opposite the handle 56 to protect surfaces on which this embodiment may be placed.

Another embodiment illustrated in FIGS. 24 through 28 utilizes a combination brief case and protective cover 73 allowing dual utility capabilities. The case 73 is the same basic retangular shape as the carrier 70 except it is wider.

There may be any numer of compartments within the case 73 however, three are preferred, one in the center to house the carrier 70 and the other two on either side to contain papers or the like in brief case fashion. The top of the case 73 has a pivoted flap 74 with a slot 76 in the center in direct alignment with the handle 56 of the carrier 70. When the carrier 70 is inserted into the center compartment of the case 73, the handle penetrates the slot 76 in the flap 74. This handle position allows manual holding of both the carrier 70 and the case 73 when contained therein during transportation and not in use as a luggage carrier. Further utility of this embodiment allows the addition of an auxillary handle 78 to be attached to the flap 74 providing a complete brief case when the carrier 70 is not employed. This auxillary removable handle 78 may be attached by any suitable means such as threaded fasteners, latches, snaps, clips or hooked and looped material commonly known by its trademark VELCRO.

A pair of latches 80 allow the flap 74 to be attached on the open end to the case 73. These latches 80 may be clasp or, toggle type or any locking arrangement found in the art with a keyed or combination locking type being preferred.

Figure 23:
FIG. 23 is partial cut-away view of the bottom of an embodiment with the protective cover in place.
Figure 24:
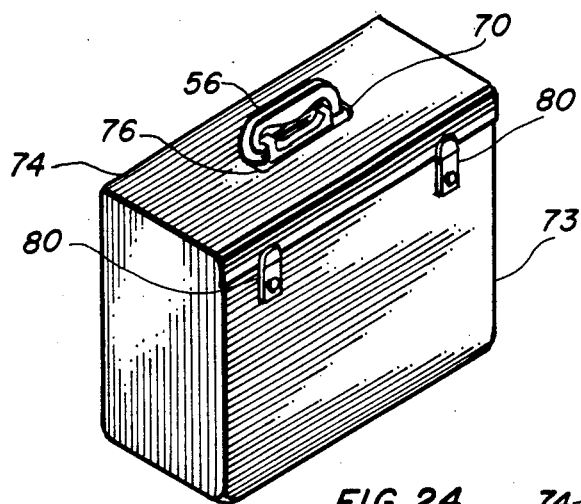
FIG. 24 is a partial isometric view of another embodiment complete with combination briefcase and protective cover.
Figure 25:
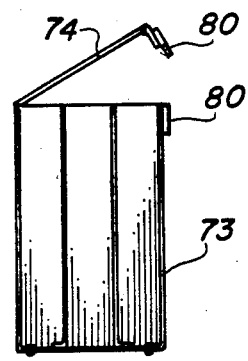
FIG. 25 is a cross-sectional view of the embodiment taken along lines 25—25 of FIG. 28 except the flap is partially opened.
Figure 26:
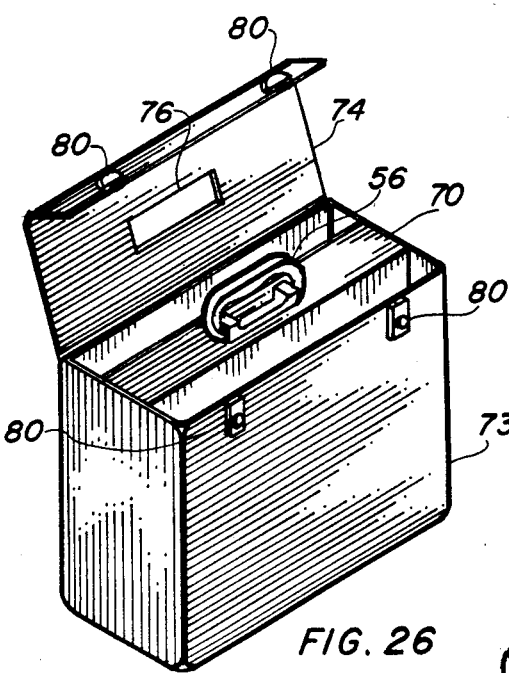
FIG. 26 is a partial isometric view of the embodiment depicted with the flap opened exposing the carrier inside.
Figure 27:
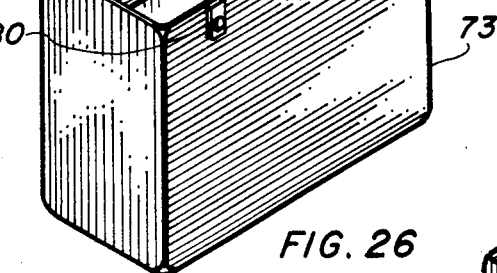
FIG. 27 is a cross-sectional view taken along lines 27—27 of FIG. 28.
Figure 28:
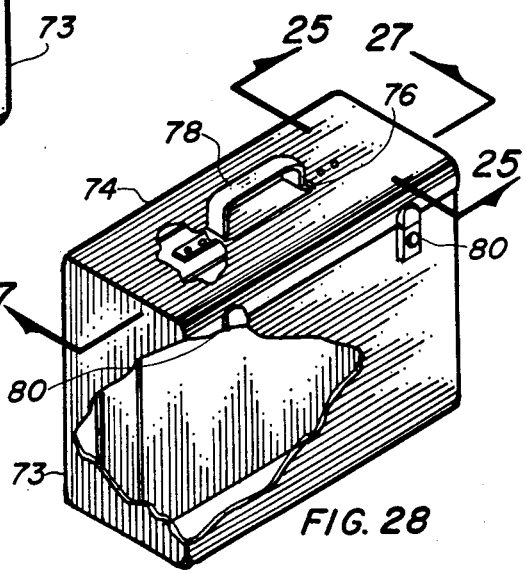
FIG. 28 is a partial isometric view of the embodiment with the carrier removed from the case and a handle added.

Another protective cover 58, best depicted in FIG. 23, optionally may be attached to the frame of this embodiment on the sides with snaps 60 or the like and is used to cover the castors and inside surface and also provide a storage space for the strap 52. The cover 58 may be any type of fabric or plastic, with vinyl being preferred.

Figure 19:
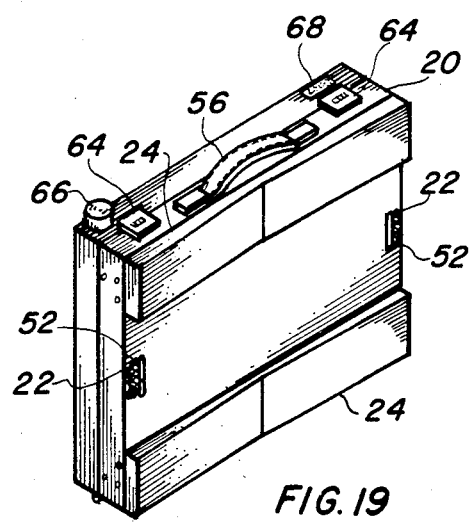
FIG. 19 is a partial isometric view of still another embodiment with the castors retracted and the back cover folded closed.
Figure 22:
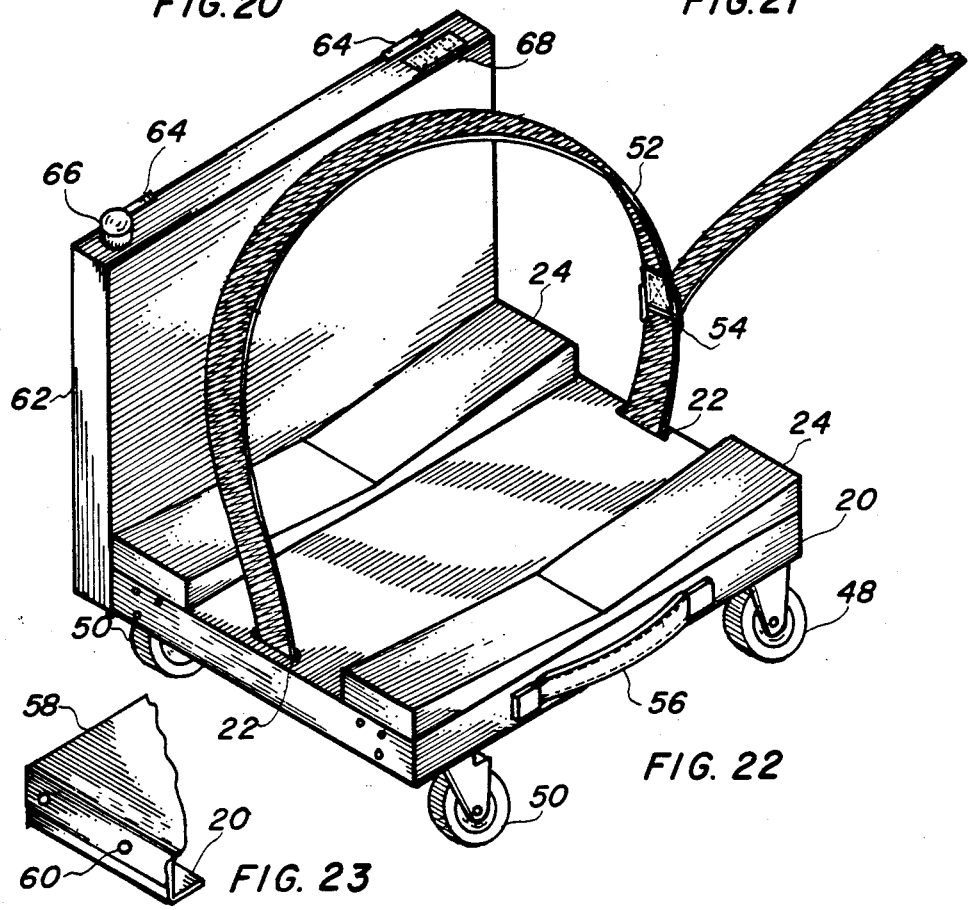
FIG. 22 is a partial isometric view of another embodiment with the back cover locked in the open position.

In yet another embodiment, illustrated in FIGS. 19 and 22, a back cover 62 is attached to the frame 20 with a hinge (not shown) and hasps 64 to secure the cover 62 to the frame 20. The cover 62 rotates open and is locked in place with the hinge at a right angle position to the frame providing a vertical structural member to the carrier and a stop to prevent luggage from slipping to the side not enclosed with the strap 52. A flashing light 66, integral with the back cover, is located on the uppermost surface when opened in the locked position. This light 66 provides a safety signal when in use and helps clear the way if the carrier is pushed in front of the operator. A clock 68 is also located in the cover 62 opposite the light 66. This device may be any type, with an electronic digital display being preferred. A power source (not shown) in the form of D.C. batteries are located within the cover for supplying the electrical energy to operate the light 66 and clock 68 and a switch may be provided for convenience.

While the invention has been described in complete detail and pictorially shown in the accompanying drawings, it is not to be limited to such details, since many changes and modifications may be made to the invention without departing from the spirit and the scope thereof. Hence, it is described to cover any and all modifications and forms which may come within the language and scope of the appended claims.

I claim:

1. A portable luggage carrier comprising:
   (a) a frame having a plurality of holes and an outside and inside flat surface to support weight for luggage mounted thereon,
   (b) a pair of retractable members positioned within said frame with rotatable attaching means being contiguous with said inside flat surface with a pair of castors attached near each end, one end having a swivel base and the other a rigid base for mobility of said luggage when extended, and for portability when retractably rotated against said inside surface,
   (c) a flexible towing strap encircling said frame to compressingly engage said luggage and provide towing means,
   (d) carrying means located on the outside surface of said frame for manually holding said carrier,
   (e) a pair of castor attaching carriages in channel shape having a flange on one end forming a box creating a mounting surface for said swivel base castors and an end flange on the other with said rigid castors disposed therewith,
   (f) a latch attaching flange formed from parent material of said carriage parallel to said end flange, and
   (g) a pair of latches in angular shape slideably positioned within said end flange and said latch attaching flange each having a pair of pins therethrough and a retaining spring compressibly engaged over said latch held in position by said pins for rotatably changing position when manually urged against spring pressure allowing rotation thereof.

2. A portable luggage carrier comprising:
   (a) a frame having a plurality of holes and an outside and inside flat surface to support weight for luggage mounted thereon,
   (b) a pair of retractable members positioned within said frame with rotatable attaching means being contiguous with said frame on said inside flat surface with a pair of castors attached near each end, one end having a swivel base and the other a rigid base for mobility of said luggage when extended, and for portability when retractably rotated against said inside surface,
   (c) a flexible towing strap encircling said frame to compressingly engage said luggage and provide towing means, and
   (d) carrying means located on the outside surface of said frame for manually holding said carrier.
   (e) a hinge pin located inside and parallel to the longitudinal axis of said retractable member with the ends protruding therefrom, forming an axial pivot surface, interfacing with the holes in said frame,
   (f) a pair of securing latches integral with said retractable members on each end slideably engaging the holes in said frame, either when extended or retracted for providing rigid locking means, and
   (g) a pair of securing latch springs surrounding said securing latches providing compression for urgingly embracing said latch to said frame.

3. A portable luggage carrier comprising:
   (a) a frame having a plurality of holes and an outside and inside flat surface to support weight for luggage mounted thereon,
   (b) a pair of retractable members positioned within said frame with rotatable attaching means being contiguous with said frame on said inside flat surface with a pair of castors attached near each end, one end having a swivel base and the other a rigid base for mobility of said luggage when extended, and for portability when retractably rotated against said inside surface,
   (c) a flexible towing strap encircling said frame to compressingly engage said luggage and provide towing means,
   (d) carrying means located on the outside surface of said frame for manually holding said carrier, and (e) a removable protective cover having a hollow body in rectangular shape with one end open to receivably accept said carrier and the opposed surface having a slot in alignment with said carrying means allowing penetration therethrough for manually holding said carrier when transported and not in use.

4. A portable luggage carrier comprising:
(a) a frame having a plurality of holes and an outside and inside flat surface to support weight for luggage mounted thereon,
(b) a pair of retractable members positioned within said frame with rotatable attaching means being contiguous with said frame on inside flat surface with a pair of castors attached near each end, one end having a swivel base and the other a rigid base for mobility of said luggage when extended, and for portability when retractably rotated against said inside surface,
(c) a flexible towing strap encircling said frame to compressingly engage said luggage and provide towing means,
(d) carrying means located on the outside surface of said frame for manually holding said carrier, and
(e) a combination brief case and protective cover in rectangular shape with the top defining a pivoted flag having a slot in alignment with said carrying means allowing penetration therethrough for manually holding said carrier when contained therein during transportation and not in use, said brief case being wider than said carrier having at least a pair of dividers allowing storage within separate compartments thus defined on either side of the carrier.

5. A portable luggage carrier comprising:
(a) a frame having a plurality of holes and an outside and inside flat surface to support weight for luggage mounted thereon,
(b) a pair of retractable members positioned within said frame with rotatable attaching means being contiguous with said frame on said inside flat surface with a pair of castors attached near each end, one end having a swivel base and the other a rigid base for mobility of said luggage when extended, and for portability when retractably rotated against said inside surface,
(c) a flexible towing strap encircling said frame to compressingly engage said luggage and provide towing means,
(d) carrying means located on the outside surface of said frame for manually holding said device,
(e) a back cover rotatably attached to said frame having one or more hinges and hasps to secure said cover to the frame and rotate open to a locked position at right angles to the frame providing a vertical structural member,
(f) a flashing light integral with said back cover located on the uppermost surface when opened in the locked position for indication and safety while the apparatus is in use as a carrier, and
(g) a clock integral with said back cover located on the uppermost surface when opened in the locked position for convenience of the operator.

6. The carrier as recited in claim 5 further comprising a power source contained within said back cover for supplying electrical energy to operate said light and clock.

* * * * *